(12) United States Patent
Gustafson et al.

(10) Patent No.: US 7,451,255 B2
(45) Date of Patent: Nov. 11, 2008

(54) HARDWARE PORT SCHEDULER (PTS) HAVING REGISTER TO INDICATE WHICH OF PLURALITY OF PROTOCOL ENGINES PTS IS TO SUPPORT

(75) Inventors: Tracey Gustafson, Hudson, MA (US); Pak-lung Seto, Shrewsbury, MA (US); Gary Y. Tsao, Austin, TX (US); Nai-Chih Chang, Shrewsbury, MA (US); Victor Lau, Marlboro, MA (US)

(73) Assignee: Intel Corporation, Santa Clara, CA (US)

( * ) Notice: Subject to any disclaimer, the term of this patent is extended or adjusted under 35 U.S.C. 154(b) by 358 days.

(21) Appl. No.: 11/238,535

(22) Filed: Sep. 28, 2005

(65) Prior Publication Data

US 2007/0088895 A1 Apr. 19, 2007

(51) Int. Cl.
*G06F 3/00* (2006.01)
*G06F 5/00* (2006.01)
*G06F 13/38* (2006.01)
*G06F 13/14* (2006.01)
*G06F 13/34* (2006.01)
*G06F 9/46* (2006.01)

(52) U.S. Cl. ............................ 710/62; 710/1; 710/36; 710/305; 710/306; 718/102

(58) Field of Classification Search .................... 710/62
See application file for complete search history.

(56) References Cited

U.S. PATENT DOCUMENTS

| 6,434,590 B1 * | 8/2002 | Blelloch et al. ............. 718/102 |
| 6,944,155 B2 * | 9/2005 | Block et al. ................. 370/389 |
| 2007/0073857 A1 * | 3/2007 | Chang et al. ................ 709/223 |

* cited by examiner

*Primary Examiner*—Niketa I Patel
*Assistant Examiner*—Richard Franklin
(74) *Attorney, Agent, or Firm*—Christopher K. Gagne (57) ABSTRACT

According to one embodiment, an apparatus is disclosed. The apparatus includes a port having a plurality of lanes, a plurality of protocol engines. Each protocol engine is associated with one of the plurality of lanes, and processes tasks to be forwarded to a plurality of remote nodes. The apparatus also includes a first port task scheduler (PTS) to manage the tasks to be forwarded to the one or more of the plurality of protocol engines. The first PTS includes a register to indicate which of the plurality of protocol engines the first PTS is to support.

16 Claims, 11 Drawing Sheets

PRIOR ART

HARDWARE PORT SCHEDULER (PTS) HAVING REGISTER TO INDICATE WHICH OF PLURALITY OF PROTOCOL ENGINES PTS IS TO SUPPORT

FIELD

This disclosure relates to computer systems; more particularly, this disclosure relates to computer system interaction with storage systems.

BACKGROUND

Serial attached storage protocols, such as serial ATA (SATA) and serial SCSI (SAS) are becoming more prevalent as storage interfaces for connecting hard drives to a computer system. In computer systems implementing such serially attached storage devices, one storage device in the system may communicate with others. For example, a device requesting data (referred to as the initiator device) may receive data from a target device.

The devices typically include a processing engine to perform input/output (I/O) transactions. A typical I/O processing engine is impeded by its reliance on system software/firmware for I/O transaction management. Currently, system software or firmware is involved in each step of I/O processing. For example, FIG. 1 shows a flow diagram of an I/O write.

Figure 1:
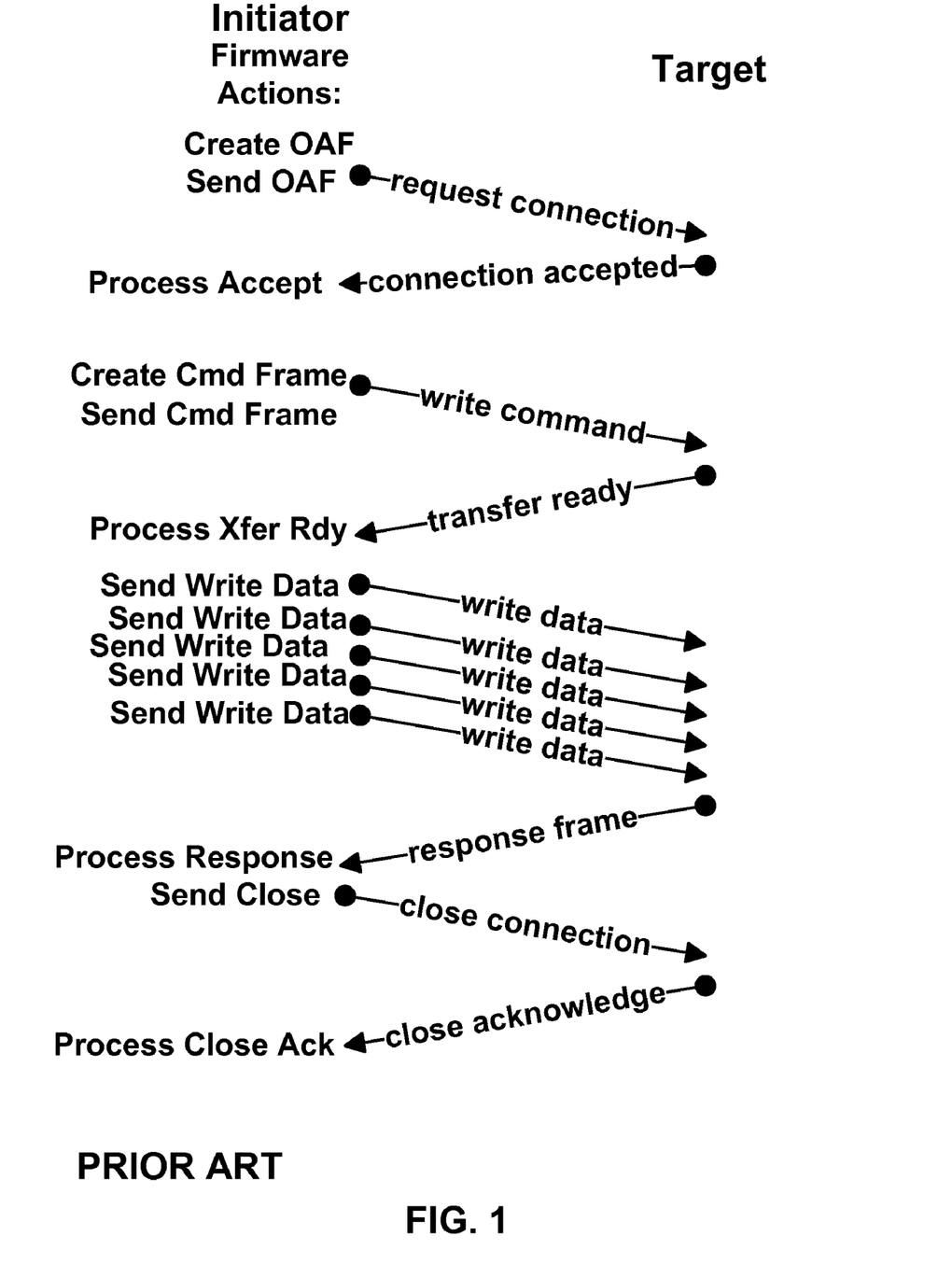
FIG. 1 is a flow diagram of an I/O write.

As shown in FIG. 1, processing a single I/O transaction involves executing multiple steps. Each action on the left side of the figure uses firmware to interact with device link layer/transport layer hardware. Each time firmware intervenes, latency is introduced into the system. This latency accumulates over the multiple steps of the I/O and has a substantial effect on the overall time of completion of the I/O transaction.

Further, in the case of a configuration with more than one lane, optimal performance occurs when all of the serial links or lanes are operating in parallel. Anytime firmware is servicing a lane, another lane may be idle while the lane is waiting for firmware interaction. The more lanes the system supports the greater the impact to system performance. Even in a single lane configuration, the single lane may be idle while waiting for firmware actions. Thus, performance may be improved anytime the real-time interaction between firmware and hardware is reduced or eliminated.

BRIEF DESCRIPTION OF THE DRAWINGS

Embodiments of the invention are illustrated by way of example and not limitation in the figures of the accompanying drawings, in which like references indicate similar elements, and in which.

DETAILED DESCRIPTION

A hardware port scheduling mechanism is described. In the following detailed description numerous specific details are set forth in order to provide a thorough understanding. However, it will be apparent to one skilled in the art that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 2:
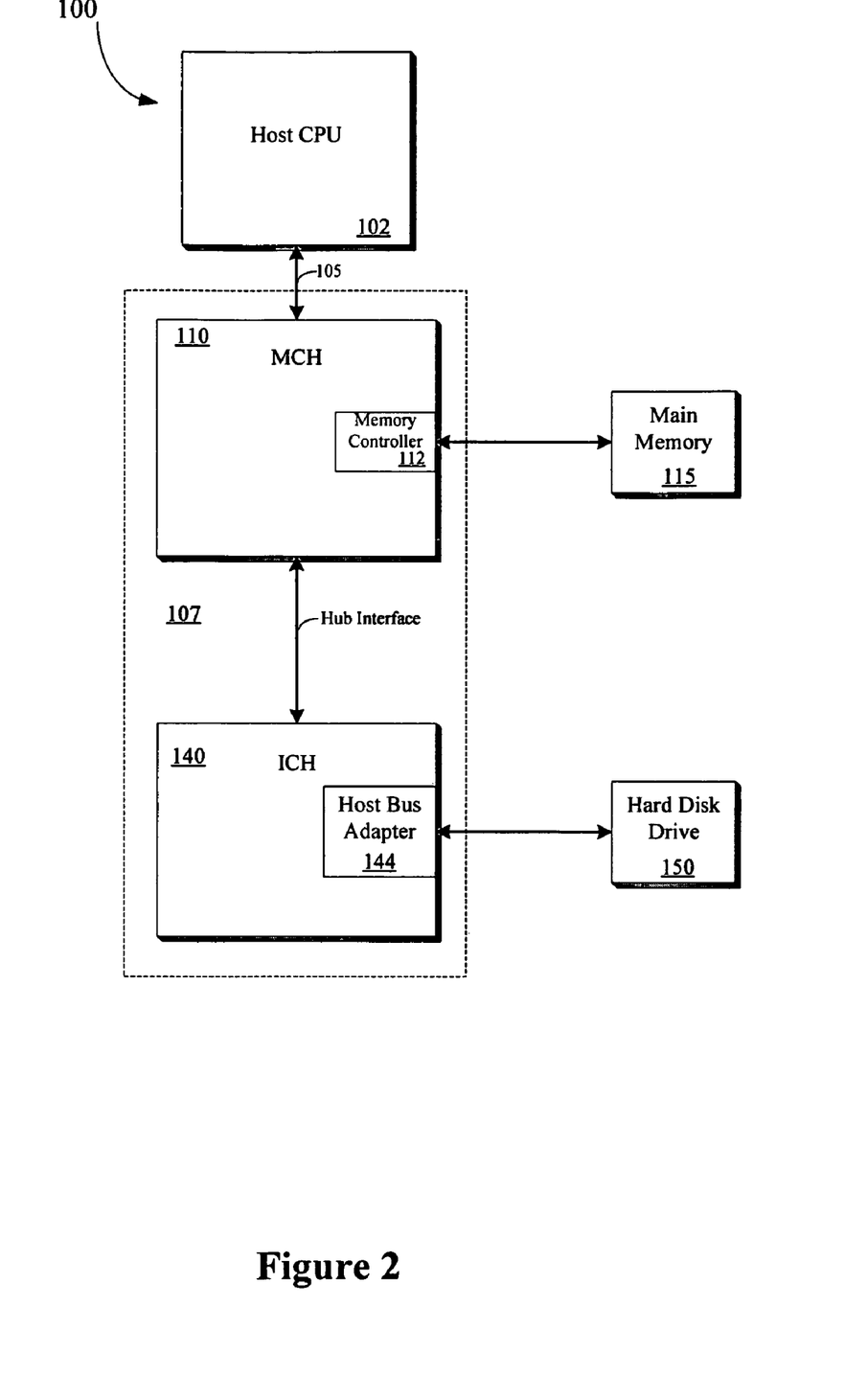
FIG. 2 is a block diagram of one embodiment of a computer system.

FIG. 2 is a block diagram of one embodiment of a computer system 100. Computer system 100 includes a central processing unit (CPU) 102 coupled to an interface 105. In one embodiment, CPU 102 is a processor in the Pentium® family of processors Pentium® IV processors available from Intel Corporation of Santa Clara, Calif. Alternatively, other CPUs may be used. For instance, CPU 102 may be implemented using multiple processing cores. In other embodiments, computer system 100 may include multiple CPUs 102

In a further embodiment, a chipset 107 is also coupled to interface 105. Chipset 107 includes a memory control hub (MCH) 110. MCH 110 may include a memory controller 112 that is coupled to a main system memory 115. Main system memory 115 stores data and sequences of instructions that are executed by CPU 102 or any other device included in system 100. In one embodiment, main system memory 115 includes dynamic random access memory (DRAM); however, main system memory 115 may be implemented using other memory types. Additional devices may also be coupled to interface 105, such as multiple CPUs and/or multiple system memories.

MCH 110 is coupled to an input/output control hub (ICH) 140 via a hub interface. ICH 140 provides an interface to input/output (I/O) devices within computer system 100. ICH 140 may support standard I/O operations on I/O busses such as peripheral component interconnect (PCI), accelerated graphics port (AGP), universal serial bus (USB), low pin count (LPC) bus, or any other kind of I/O bus (not shown).

According to one embodiment, ICH 140 includes a host bus adapter (HBA) 144. HBA 144 serves as a controller implemented to control access to one or more hard disk drives 150. In one embodiment, hard disk drive 150 is a serial SCSI (SSP) drive. However in other embodiments, hard disk drive 150 may be implemented as other serial drives. Thus, HBA 144 is capable of controlling different device types.

Figure 3:
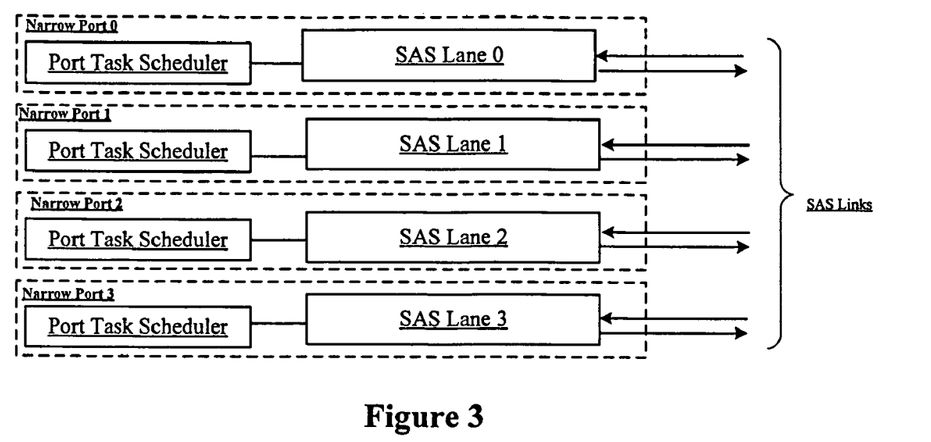
FIG. 3 illustrates one embodiment of a port task scheduler.

HBA 144 includes one or more ports associated with each of the one or more hard disk drives 150 to which it is coupled. Further, HBA 144 includes a hardware Port Task Scheduler (PTS) included to forward tasks to a given port. In one embodiment, a PTS is dedicated to each lane in HBA 144. Such an application is referred to as a SAS narrow port application. FIG. 3 illustrates one embodiment of a PTS implemented in a SAS narrow port application.

Figure 4:
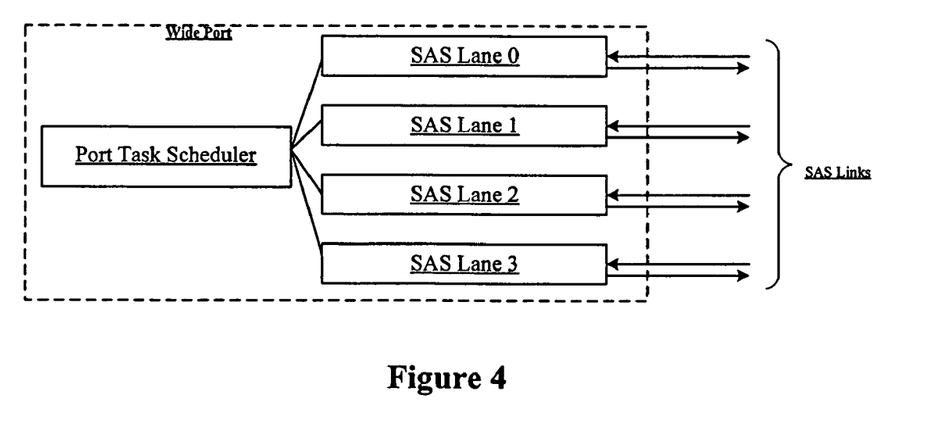
FIG. 4 illustrates another embodiment of a port task scheduler.

However, in other embodiments, a PTS may support multiple lanes, which is referred to as a SAS wide port application. FIG. 4 illustrates one embodiment of a PTS implemented in a SAS wide port application. Further, all lanes may be serviced simultaneously by algorithms that can be tuned to the properties of the particular port.

Figure 5A:
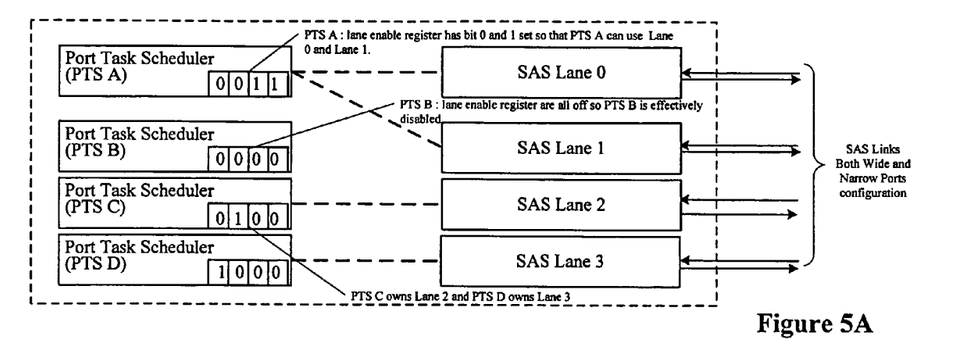
FIGS. 5A-5C illustrates other embodiments of a port task scheduler.
Figure 5B:
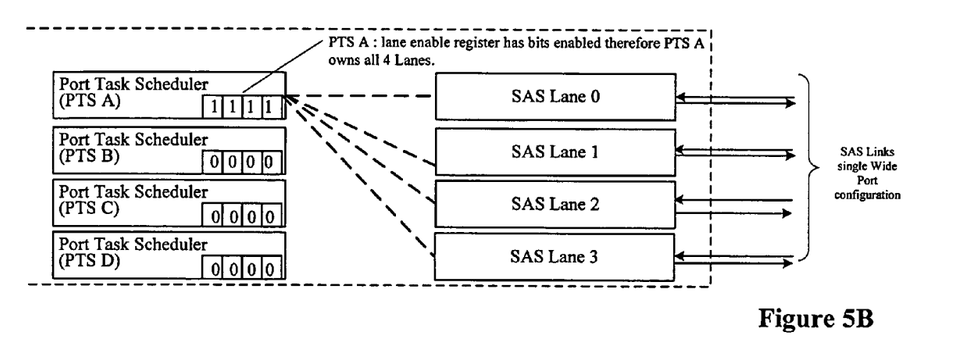
Figure 5C:
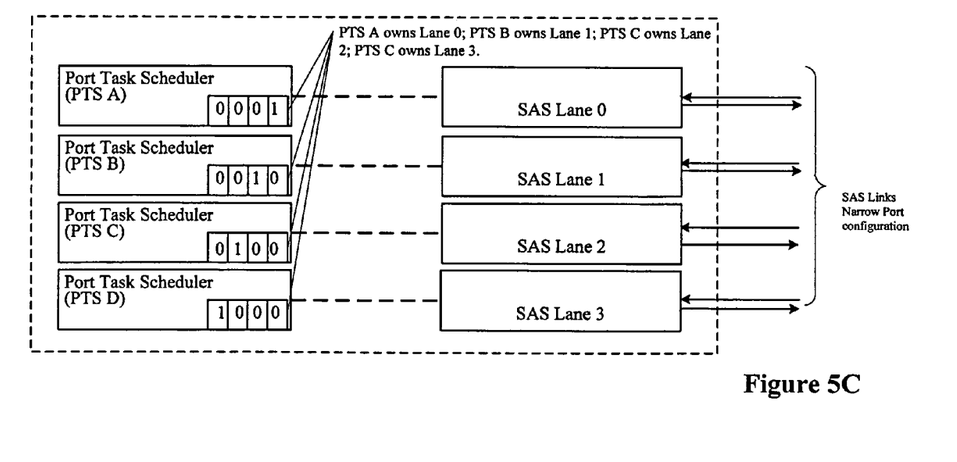

According to one embodiment, each PTS includes a lane enable register having programmable bits corresponding to each lane in a port. The lane enable register indicates which lane(s) in the port the PTS is to support. FIGS. 5A-5C illustrate embodiments of a PTS including a lane enable register. In each figure, PTS units A-D have a 4-bit lane enable register (bits 0-3), where bit 0 represents lane, bit 1 represents lane 1, etc.

If a bit is set to a logical 1, the corresponding lane is enabled for the PTS. For example in FIG. 5A, PTS A has the bit values 0011. Thus, PTS A supports lanes 0 and 1. No bits are set for PTS B, which supports no lanes. PTS C and PTS D have values of 0100 and 1000, respectively, to indicate that PTS C and PTS D support lanes 2 and 3, respectively. As shown in FIGS. 5A-5C the PTS units are programmable to be configured to support SAS narrow port or wide port applications.

Figure 6:
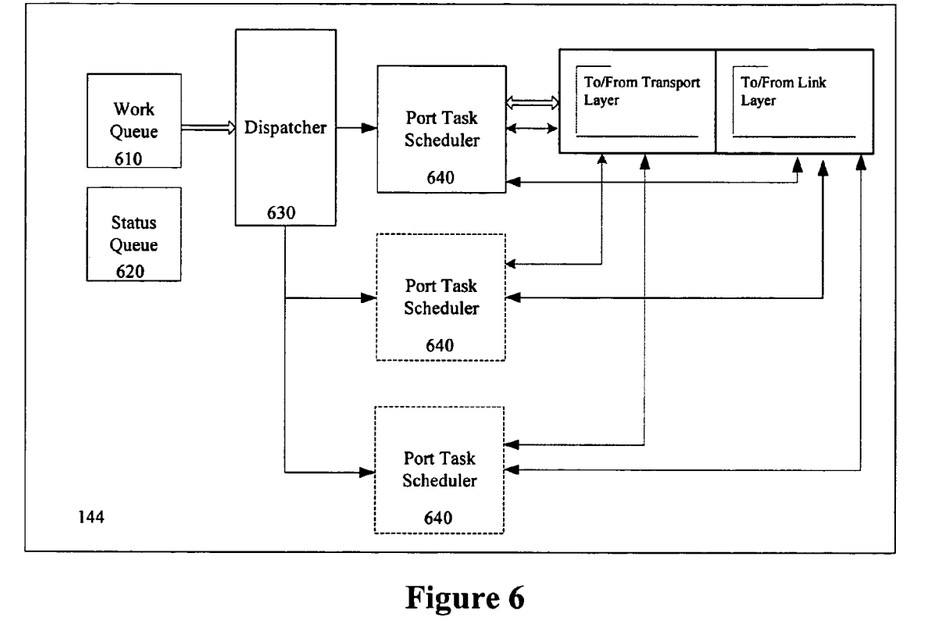
FIG. 6 illustrates one embodiment of an host bus adapter.

According to one embodiment, HBA 144 limits the firmware-hardware interaction to a defined asynchronous queue interface. FIG. 6 illustrates one embodiment of HBA 144. HBA 144 includes a work queue 610, a status queue 620, a dispatcher 630 and PTS units 640. In a further embodiment, multiple PTS units 640 operate in parallel to support multiple ports in HBA 144. In such an embodiment, there is one PTS 640 per port, with each PTS 640 having its own interface to a transport and link layer. Further, a single work queue 620, status queue 620 and dispatcher 630 support all of the PTS units 640 in HBA 144.

In one embodiment, status queue 610 and work queue 620 interface to the system 100 software/firmware. As a result, firmware pushes outbound tasks into work queue 610 and retrieves status of the completed tasks from status queue 620. After pushing a task into work queue 610, the firmware is released from processing this task. The firmware can poll or be interrupted to receive the status of tasks from status queue 620 after completion.

Dispatcher 630 receives tasks from work queue 610 and forwards the tasks to the appropriate PTS 640. Each task received at dispatcher 630 includes a tag that is associated with a remote node to which the task is to be forwarded. Since each port is associated with a remote node for mapping, dispatcher 630 is able to dispatch a task to the proper PTS 640 that is servicing the particular remote node.

Figure 7:
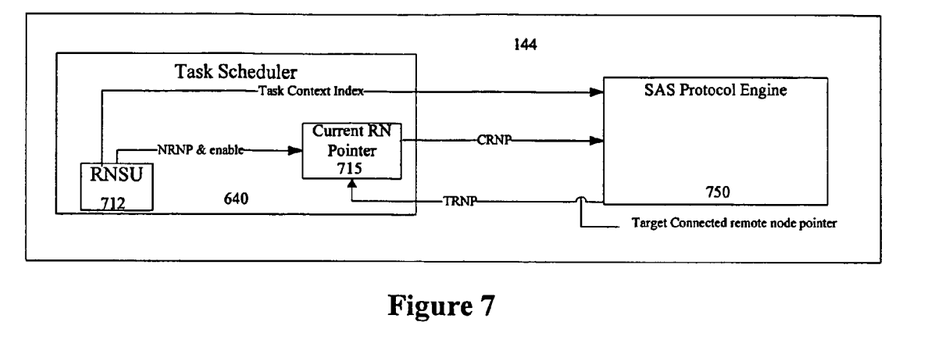
FIG. 7 illustrates one embodiment of an host bus adapter.

FIG. 7 illustrates one embodiment of a PTS 640 implementing a SAS narrow port configuration. PTS 640 is coupled to a SAS protocol engine 750. PTS 640 manages data structures that organize all tasks pending for an associated port by scheduling the tasks to be processed at protocol engine 750. PTS 640 includes a remote node searching unit (RNSU) 712 and current remote node (RN) pointer 715. RNSU 712 includes a next RN finder that searches for the next node that includes a task to be serviced by protocol engine 750, while current RN pointer 715 indicates the current node being processed.

According to one embodiment, RNSU 712 includes two parts, a horizontal scheduler and a vertical scheduler. In one embodiment, a horizontal scheduler list (called the Active Remote Node List) is a linked list. A Next Remote Node Finder (NRNF) in RNSU 712 goes through this list and selects the remote nodes to service based on fair round robin or weighted round robin algorithm. Each list item corresponds to an Active Remote Node that may be accessed through the port.

Further, each list element includes pointers that point to tasks for that remote node. A remote node is active if it has pending tasks. When a remote node no longer has any pending tasks it is removed from the linked list, which speeds up the traversal of the list. The Active Remote Node List Element includes a previous and next list-element pointer, some properties and a set of indexes for lists of tasks to be executed by that Remote Node.

Figure 8:
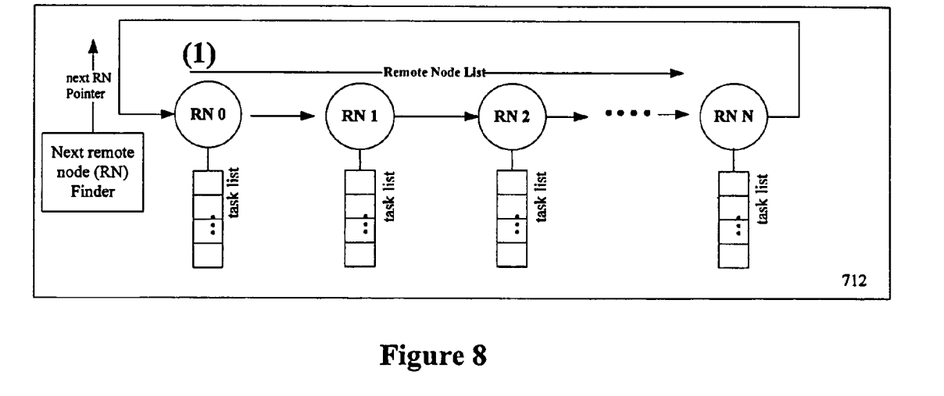
FIG. 8 illustrates one embodiment of a remote note searching unit.

FIG. 8 illustrates one embodiment of the scheduler horizontal and vertical lists in which RNSU 712 implements a remote node searching round robin algorithm. In this example, PTS 640 first services Remote Node 0 (RN0) and then finds the next RN pointer from the remote node list and sets the next pointer to RN1. Once PTS 640 is done with servicing RN0, RN1 may begin processing based on the next pointer. Subsequently, PTS 640 finds RN2 and sends it to the next pointer, and so on.

The same steps are repeated as described above in a round robin fashion. In one embodiment, when PTS 640 goes to the next remote node and finds tasks to issue to protocol engine 750, the next remote node pointer (NRNP) should be saved as a current remote node pointer (CRNP) and be used for establishing connection. Whenever the connection is established, PTS 640 assigns tasks via sending task context index to protocol engine 750.

In addition, when a target connects to protocol engine 750, the target connected remote node pointer should be sent to the CRNP. Further, when the task scheduler determines a new remote node is to be serviced, a connection management unit (not shown) closes the connection on a previous remote node (or the connection is closed by the target) and opens a connection to the next remote node.

The vertical scheduler includes of list of the pending tasks for a Remote Node. In one embodiment, there are multiple vertical lists for each Remote Node. The vertical lists are separated by protocol, priority, initiator/target and blocking/non-blocking (ordering). Not all lists will be applicable to every remote node. Each Active Remote Node Element has pointers to these task lists. In one embodiment, each vertical scheduler list is a linked list. Further, each element of a list has a previous and next list-element field. The details of the vertical list will be described below in further detail.

Figure 9:
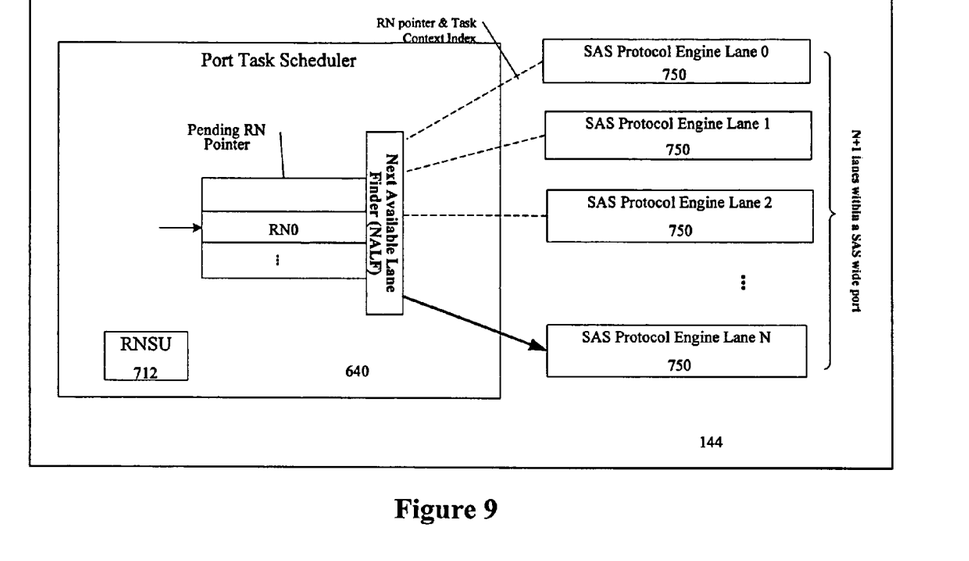
FIG. 9 illustrates another embodiment of a host bus adapter.
Figure 10:
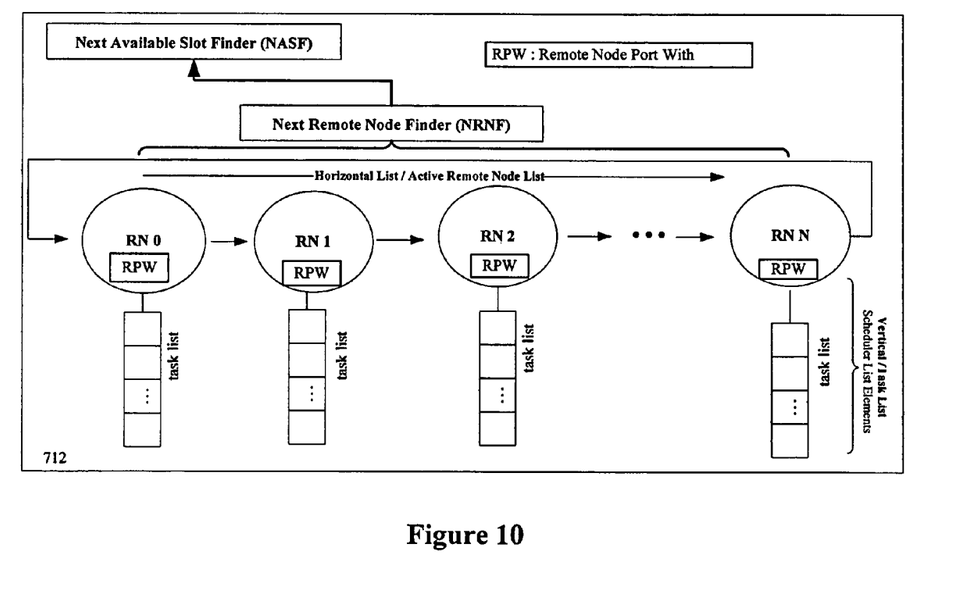
FIG. 10 illustrates another embodiment of a remote note searching unit.

FIGS. 9 and 10 illustrate one embodiment of a PTS 640 implementing a SAS wide port configuration, with PTS 640 coupled to multiple SAS protocol engines 750. FIG. 9 shows PTS 640 including a Next Available Lane Finder (NALF), which finds the next available lane for selected remote nodes.

In addition, RNSU 712 includes a Next Remote Node Finder (NRNF) which finds the next remote node to service based on an algorithm (e.g., a round robin or weighted round robin algorithm similar to that of the narrow port case in FIG. 8), as shown in FIG. 10. PTS 640 also includes a Next Available Slot Finder (NASF) which finds the next available slot for those selected remote nodes from the NRNF.

In one embodiment of PTS 640 wide port operation, the NRNF finds a remote node and sends the remote node to the NASF. The NASF finds an available slot in current RN pointer and sends the remote node to the selected slot (e.g., pending RN pointer). The NALF finds a free lane and forwards the remote node. The pending RN pointer is released. The protocol engine 750 connection manager uses the information in the remote node context to establish connection to the dedicated remote node. The above-described process is repeated until no Active Remote Nodes are pending.

According to a further embodiment, when a protocol engine 750 is connected to a remote node, the protocol engine receives information to process the task from the corresponding vertical list element (e.g., including, but not limited to, attributes of the task and a pointer to the task context). Note that the connection manger may not be able to establish the connection. When connection request is rejected with retry-able conditions such as OPEN_REJECT(RETRY), OPEN_REJECT(PATHWAY BLOCKED), OPEN_REJECT(STP RESOURCES BUSY), etc., SAS protocol engine 750 should send the remote node back to the 'Pending RN pointer'.

When the retry-able conditions occur, an Arbitration Wait Time (AWT) and/or Pathway Blocked Count (PBC) counters are started before the NALF finds the next available lane and forwards the RN to the next available lane. When the connection fails due to any non-retry-able conditions, the remote node scheduler list element is sent back to the vertical list directly, which resets both AWT and PBC counters as well as increment the remote node port width (RPW) counter described in further detail below.

In a further embodiment, when there are several remote nodes in the pending RN pointer waiting and there is a protocol engine 750 available, the NALF selects which remote node to send to the available lane. In one embodiment, this is done by comparing the AWT timer value described above. However, there may be a case when multiple remote nodes have an AWT timer value of zero because they have yet to be retried. Thus, by comparing the AWT timer value the oldest pending remote node cannot be determined.

Figure 11:
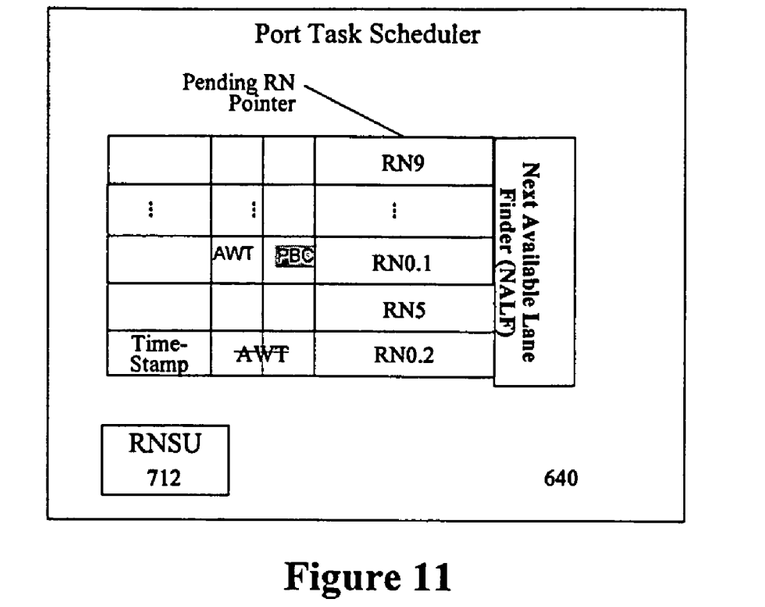
FIG. 11 illustrates another embodiment of a port task scheduler.

According to one embodiment, a time-stamp mechanism is implemented. In such an embodiment, a time-stamp value associated with each remote node is compared to determine the order in the pending RN pointer. FIG. 11 illustrates one embodiment of a task scheduler 640 implementing a time stamp in the pending RN pointer. Note that the time-stamp value is assigned to a remote node only the first time the remote node is sent to the pending RN pointer.

Figure 12:
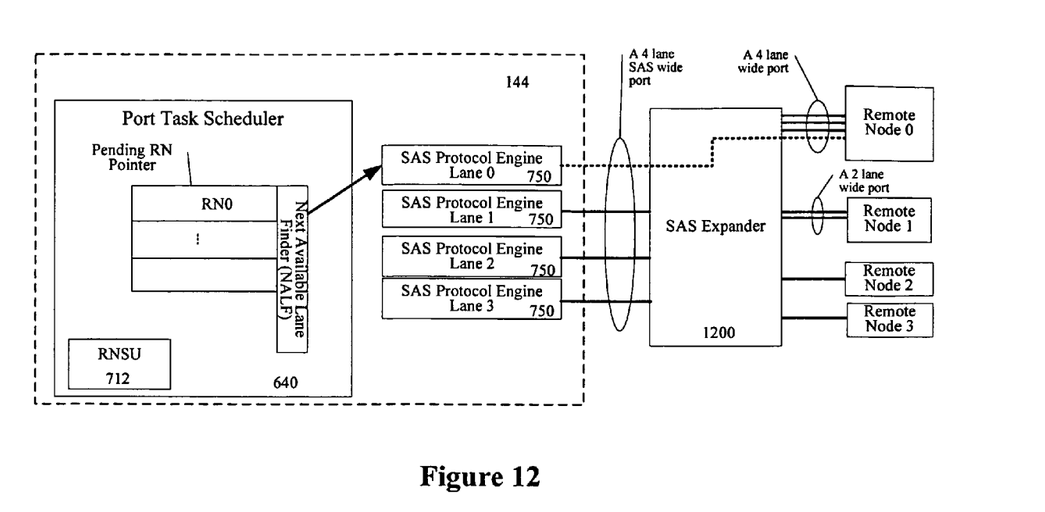
FIG. 12 illustrates another embodiment of an host bus adapter.
Figure 13:
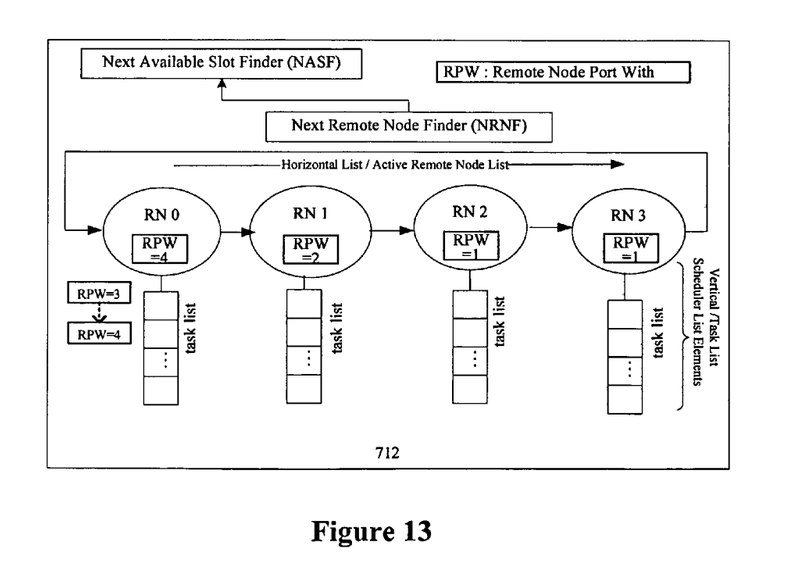
FIG. 13 illustrates another embodiment of a remote note searching unit.

In addition to the above remote node and available lane searching process, a remote node port width (RPW) factor is to be considered for task scheduling. FIGS. 12 and 13 illustrate one embodiment of the operation of HBA 144 when coupled to an expander 1200. As shown in FIG. 13, when the NRNF goes to the end of the horizontal list, the NRNF wraps back to Remote Node 0 (RN0) to find tasks.

The NALF (FIG. 12) attempts to send RN0 if there is an available lane to establish another connection to RN0 even if there is a connection open already to RN0. Note that, in FIG. 12, RN0 supports a 4-lane wide port configuration so that it is allowed to have up to 4 connections open concurrently.

According to one embodiment, RPW counters are included within RNSU 712 in order to track the servicing of the same remote node multiple times (FIG. 13). For instance, as shown in FIG. 12, Remote Node 1 (RN1) only supports a 2-lane wide port. If both lanes are connected, the NRNF is aware to enable it to skip RN1 and move onto the next remote node.

This issue is solved by using the RPW counter. When a remote node is selected and sent to the NASF, the associated RPW counter is decremented by one. When the counter value is zero, this remote node is skipped. When a connection is closed by the remote node or the connection fails to be opened to the remote node, the associated counter is incremented by one. In one embodiment, the default value of the RPW counter is programmable, but limited to the maximum allowable connection lane number of a remote node, which can be found in device discovery.

While going through the horizontal list (Active Remote Node List) a programmable option enables a remote node to be skipped if the remote node already has a connection open (even if its RPW counter value is not zero) and there are some other remote nodes with tasks pending in their list(s). According to one embodiment, this process can be tracked in the NRNF by adding a RN connected register. When the connected RN bit is set, the NRNF should skip this remote node and go on to the next active Remote Node. If a particular remote node is skipped several times the remote node should not be skipped again.

In a further embodiment, A Local Port Width (LPW) is included to indicate a number of configured lanes that PTS 640 can assign tasks to within a SAS wide port, or similar configuration. In such an embodiment, there could be four physical lanes in the integrated circuit within the same wide port. However, if one lane is unavailable for any other reason only three lanes may be used by PTS 640.

Figure 14:
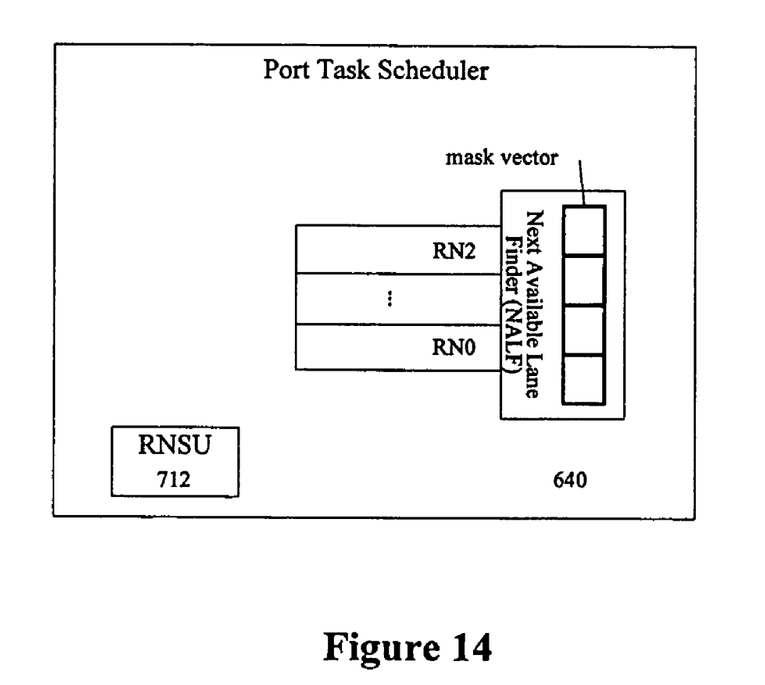
FIG. 14 illustrates another embodiment of a port task scheduler.

Therefore, the NALF takes LPW into account in finding the next available lane. In one embodiment, the LPW can be achieved by creating a mask vector (e.g., one bit per lane). If a lane is unavailable, the corresponding mask bit is set so that the NALF cannot use the lane. FIG. 14 illustrates one embodiment of PTS 640 implementing mask bits.

Figure 15:
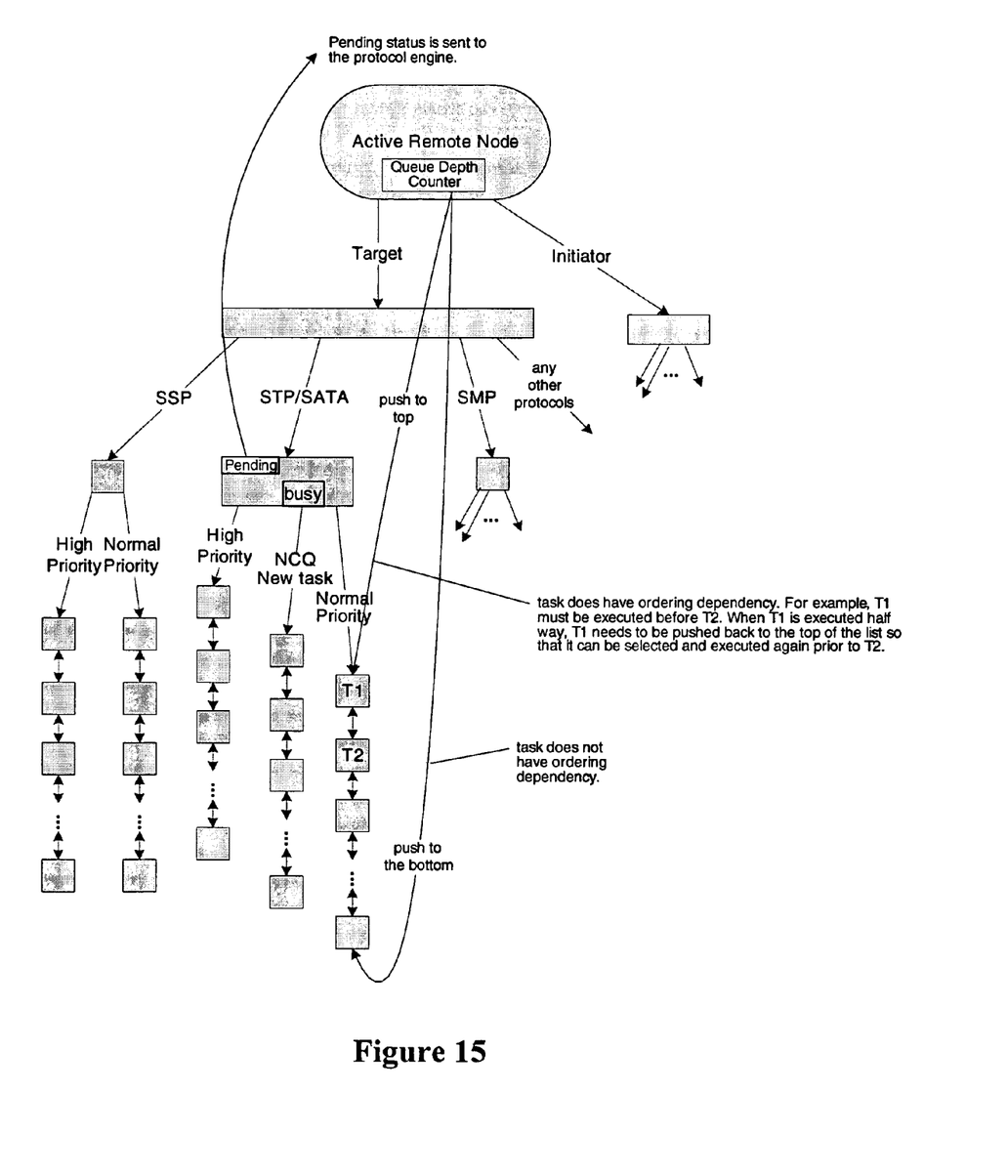
FIG. 15 illustrates one embodiment of a vertical task list.

As discussed above, the vertical list includes pending tasks for a remote node. The lists are categorized by various factors (e.g., initiator/target, protocol types, priority, ordering) and protocol specific factors (e.g., new task for NCQ operation). FIG. 15 illustrates one embodiment of a vertical task list.

A remote node can be served as either initiator or target mode. When the remote node is in target mode, the 640 served as the initiator task scheduler and can send certain types of tasks such as I/O commands, etc. When the remote node is in initiator mode, PTS 640, which is now served as a target task scheduler, can send certain types of tasks to respond to the remote node (initiator) such as sending XFER_READY, RESPONSE Frames, etc. Some remote nodes can be only initiator or target nodes. Note that all of this information can be discovered in a device discovery process.

Within a single remote node, different protocols can be supported. For instance, a target remote node can support SSP, STP and SMP. In some phases, a PTS 640 sends SMP related tasks such as device discovery to collect necessary information to configure certain registers such as remote node queue depth register, supported protocols, etc. After the device discoveries and configurations, the PTS 640 can start sending SSP tasks to that remote node. Therefore, it is easier to maintain separate task lists based on protocol types. Note that, the supported protocol types also depend on the local port capability (e.g., if the local port does not support STP (even if the remote node supports it), the STP list should be disabled).

There are two types of priorities—high and normal priority. A PTS 640 favors servicing the high priority list prior to the normal priority. When a task is non-blocking (e.g., there is no requirement for it to finish before another task) and it has been partially executed the task will then be pushed back to the bottom of the vertical list. Other tasks ahead of it will be selected before this task completes, which promotes fairness. However, when a blocking task, such as data sequence, is partially executed it will be pushed back to the top of the vertical list. This task will then be executed completely before the PTS 640 can select a different task. The blocking tasks include primitives, frame sequence, etc. An I/O typically is non-blocking.

In the SATA protocol the host issues the next new command only if a busy bit in a status register is cleared. In SATA Native Command Queuing operation the device clears the busy bit by sending a device-to-host register FIS with bit 7 (busy bit) cleared. In the vertical list of STP/SATA there is busy bit register defined. When the busy is cleared, the task can be selected from the NCQ New Task list. When the task is sent out to the protocol engine, the busy bit is set which blocks all other tasks in NCQ New Task List. When the protocol engine receives the clear busy bit status register FIS, it clears the busy bit in the NCQ New Task List which resumes the task selecting process.

In addition to the above factors, a queue depth counter is included to assist task scheduling. In the device discovery process, the queue depth of the remote node is programmed to a queue depth counter. When the PTS 640 sends a new command to the remote node, it decrements the queue depth counter for that remote node. When the queue depth counter becomes zero, the PTS 640 stops issuing new commands to that Remote Node. When an outstanding command is completed (e.g., received response frame in SAS), PTS 640 increments the queue depth counter by one. The queue depth counter eliminates firmware's tracking of the total number of outstanding commands. Firmware can send all of the commands (up to the PTS 640 task list entry limit) to the PTS 640.

Moreover, in SAS-STP protocol, when the initiator is closing a connection, it tells the target device if the device should clear affiliation. When there is no pending task in the STP/SATA list, the pending register should be cleared so that when the protocol engine 750 closes the connection in STP, the protocol engine 750 should send clear affiliation to the device. When the device receives clear affiliation, the device is free to accept any new connections from any initiator. When the affiliation is not cleared in the device, the device only allows the original initiator to connect.

A task remains in the Scheduler List Element data structure until the task is completed. This allows an I/O Timeout Value to be associated with the I/O Task Context and maintained through-out the lifetime of the I/O. This timeout value is compared to a free-running timer without firmware intervention. If a timeout is detected the Status Queue interface is used to inform firmware.

As discussed above, the firmware interaction with the hardware is limited to work queue 610 and status queue 620. Firmware is off-loaded to service more system level I/O, which are pushed to work queue 610. The I/O transactions execute on the link layer more efficiently, resulting in an overall I/O performance increase.

The above described hardware implemented PTS provides a performance increase in the scheduling of outbound I/O tasks using current mechanisms of firmware control. Hardware scheduling reduces the core frequency requirements by minimizing its effects on I/O processing. Also parallel hardware can accommodate a large number of remote nodes with various protocol and priority tasks while offering this increased performance. Management of I/O timeout and Arbitration Wait Timer in hardware also reduces firmware overhead.

Figure 16:
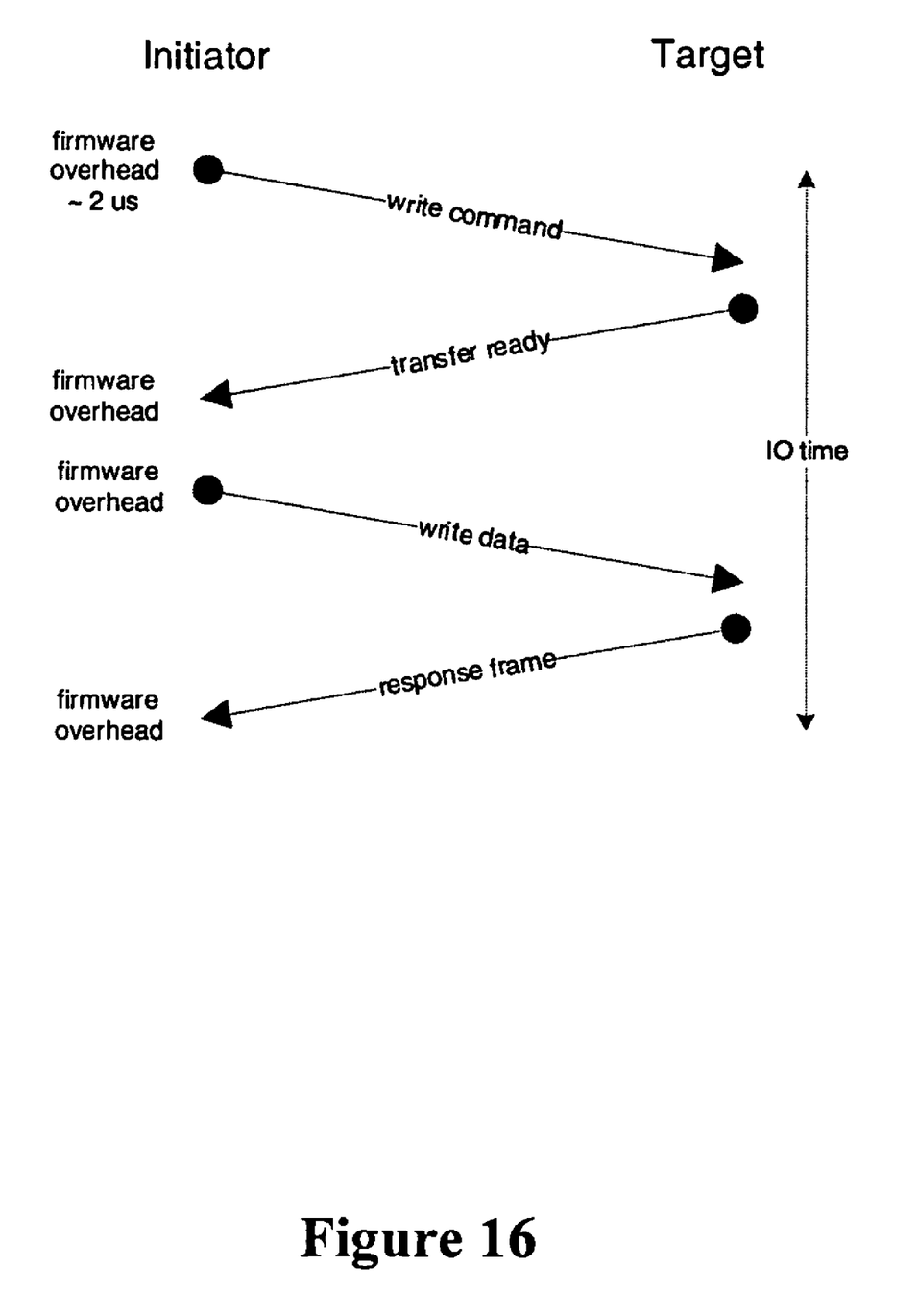
FIG. 16 is a flow diagram of illustrating one embodiment of an I/O write.

FIG. 16 shows the time for I/O transfers and firmware interaction. In the firmware controlled case the I/O time is estimated to be 5 microseconds. Each time firmware interacts, the overhead is estimated up to 2 microseconds or more. This yields a 13 microsecond or more total. For the hardware controlled scheduler the I/O time is shorter (approximately 4 microseconds) because there is optimization for transfer ready and response frame processing. The firmware overhead is zero, therefore the total time is approximately 4 microseconds.

Whereas many alterations and modifications will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims.

What is claimed is:

1. An apparatus comprising:
    a port having a plurality of lanes;
    a plurality of protocol engines, each associated with one of the plurality of lanes, to process tasks to be forwarded to a plurality of remote nodes;
    a first port task scheduler (PTS) to manage the tasks to be forwarded to the one or more of the plurality of protocol engines, the first PTS having a register to indicate which of the plurality of protocol engines the first PTS is to support; and
    a second PTS having another register to indicate which of the plurality of protocol engines the second PTS is to support.

2. The apparatus of claim 1 wherein the registers in the first PTS and the second PTS include a bit corresponding to each of the plurality of lanes, each bit indicating whether the first PTS or the second PTS is to forward tasks to a corresponding lane.

3. The apparatus of claim 2 further comprising:
    a dispatcher to dispatch tasks to the first PTS and the second PTS;
    a work queue; and
    a status queue.

4. The apparatus of claim 3 further comprising tasks residing in the work queue and the status of tasks pushed into a status queue.

5. The apparatus of claim 1 wherein the PTS comprises:
    a remote node search unit (RNSU) to search for a next remote node to service; and
    a current remote node pointer.

6. The apparatus of claim 5 wherein the RNSU includes a horizontal scheduler and a vertical scheduler.

7. The apparatus of claim 6 wherein the vertical scheduler includes a list of pending tasks for remote nodes to be serviced by the PTS.

8. The apparatus of claim 5 wherein the PTS comprises:
    a next available lane finder (NALF) to find a next available lane for a remote node; and
    a pending remote node pointer.

9. The apparatus of claim 8 wherein the PTS includes a time stamp value associated with each remote node to determine an order in the pending remote node pointer.

10. The apparatus of claim 8 wherein the PTS includes counters associated with each remote node to facilitate arbitration fairness.

11. A system comprising:
    a plurality of remote nodes;
    an expander device coupled to the plurality of remote nodes; and a host device having:
  a port, coupled to the expander device, having a plurality of lanes;
  a plurality of protocol engines, each associated with one of the plurality of lanes, to process tasks to be forwarded to the plurality of remote nodes via the expander device;
  a port task scheduler (PTS) to manage the tasks to be forwarded to one or more of the plurality of protocol engines, the PTS having a register to indicate which of the plurality of protocol engines the PTS is to support, the PTS including a mask vector for tracking a local port configuration.

12. The system of claim 11 wherein the register in the PTS includes a bit indicating whether the PTS is to forward tasks to a corresponding lane.

13. The system of claim 11 wherein the PTS comprises:
  a remote node search unit (RNSU) to search for a next remote node to service; and
  a current remote node pointer.

14. The system of claim 13 wherein the PTS further comprises:
  a next available lane finder (NALF) to find a next available lane for a remote node; and
  a pending remote node pointer.

15. The system of claim 14 wherein the RNSU includes remote node port width (RPW) counters to track the number of times a remote node has been service.

16. The system of claim 13 wherein the RNSU includes a horizontal scheduler and a vertical scheduler.

* * * * *